United States Patent
Yu et al.

(10) Patent No.: US 12,269,540 B2
(45) Date of Patent: Apr. 8, 2025

(54) DRIVE MODULE HAVING WHEEL

(71) Applicants: Hyundai Motor Company, Seoul (KR); Kia Corporation, Seoul (KR)

(72) Inventors: Geun Sang Yu, Chungcheongnam-do (KR); Hun Keon Ko, Gyeonggi-do (KR); Joo Young Chun, Seoul (KR); Eun Ho Seo, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 812 days.

(21) Appl. No.: 17/480,583

(22) Filed: Sep. 21, 2021

(65) Prior Publication Data

US 2022/0266892 A1  Aug. 25, 2022

(30) Foreign Application Priority Data

Feb. 24, 2021  (KR) .................. 10-2021-0025051

(51) Int. Cl.
  *B62D 5/04*  (2006.01)
  *B60K 7/00*  (2006.01)

(52) U.S. Cl.
  CPC .......... *B62D 5/0418* (2013.01); *B60K 7/0007* (2013.01); *B62D 5/0481* (2013.01); *B60K 2007/0092* (2013.01)

(58) Field of Classification Search
  CPC ... B62D 5/0418; B62D 5/0481; B60K 7/0007
  See application file for complete search history.

(56) References Cited

U.S. PATENT DOCUMENTS

| | | | |
|---|---|---|---|
| 7,426,970 B2* | 9/2008 | Olsen | B60K 7/0007 180/908 |
| 9,169,005 B2* | 10/2015 | Oswald | F16H 48/08 |
| 11,052,002 B2* | 7/2021 | Garland | A61G 5/061 |
| 2014/0284421 A1* | 9/2014 | Osman | B64C 25/405 244/50 |

\* cited by examiner

*Primary Examiner* — Jacob D Knutson
(74) *Attorney, Agent, or Firm* — Fox Rothschild LLP

(57) ABSTRACT

The present disclosure provides a drive module that includes a drive part that is coupled to a wheel and has first to third motors. The drive part also includes a sensor part that has first to third sensors to detect a motion of the drive part. The sensor part includes a first sensor that is configured to detect a motion of the first rotary shaft, a second sensor that is configured to detect a motion of the second rotary shaft and a third sensor that is configured to detect a motion of the third rotary shaft.

19 Claims, 12 Drawing Sheets

DRIVE MODULE HAVING WHEEL

CROSS-REFERENCE TO RELATED APPLICATION

This application claims priority to and the benefit of Korean Patent Application No. 10-2021-0025051 filed on Feb. 24, 2021, the entire contents of which are incorporated herein by reference.

TECHNICAL FIELD

The present disclosure relates to a drive module having a wheel, and more particularly, to a drive module with a wheel having an increased degree of freedom.

BACKGROUND

The technology paradigm is shifting from vehicles using internal combustion engines as power sources to electric vehicles using electric motors as power sources. Further, there is an increasing demand for mobility vehicles mounted with autonomous driving functions. Therefore, various studies are actively conducted on mobility vehicles using electric motors as power sources.

The mobility vehicles can be used in various fields. For example, the mobility vehicles may be used not only to transport people, but also to deliver goods. In the related art, however, there is a limitation in moving the mobility vehicle according to the environment of the ground surface on which the mobility vehicle travels, and the limitation is an obstacle that hinders the development of the mobility vehicle.

SUMMARY

The present disclosure has been made in an effort to provide a drive module having a novel structure that may have various degrees of freedom in comparison with the related art, thereby coping with a change in external factors such as an environment of a ground surface.

In one aspect, the present disclosure provides a drive module that may include: a wheel; and a drive part having one side coupled to the wheel; and a sensor part configured to detect a motion of the drive part, in which the drive part may include: a first motor having a first rotary shaft and configured to rotate the wheel about the first rotary shaft; a second motor having a second rotary shaft spaced apart from the first rotary shaft in a radial direction R of the wheel, the second motor being configured to rotate the wheel about the second rotary shaft; and a third motor having a third rotary shaft extending in a direction intersecting the first rotary shaft and the second rotary shaft, the third motor being configured to steer the wheel about the third rotary shaft, and in which the sensor part includes: a first sensor configured to detect a motion of the first rotary shaft; a second sensor configured to detect a motion of the second rotary shaft; and a third sensor configured to detect a motion of the third rotary shaft.

The first rotary shaft may be disposed at a center in the radial direction R of the wheel, and the first motor may rotate the wheel about the first rotary shaft. The second motor may rotate the wheel about the second rotary shaft. The first rotary shaft and the second rotary shaft may be provided in parallel with each other. A distance between the first rotary shaft and the second rotary shaft may be less than a radius of the wheel. The third rotary shaft may be provided to be perpendicular to the first rotary shaft and the second rotary shaft.

An extension line of the first rotary shaft and an extension line of the third rotary shaft may be orthogonal to each other when the second rotary shaft has a predetermined rotation angle. An extension line of the second rotary shaft and an extension line of the third rotary shaft may be orthogonal to each other.

The drive module may further include: a second rotary shaft accommodation member provided at a first side of the second motor and configured to accommodate the second rotary shaft; a third rotary shaft accommodation member provided at a first side of the third motor and configured to accommodate the third rotary shaft; and a connection member coupled to a first side of the second rotary shaft accommodation member in a width direction W of the wheel and provided between the second rotary shaft accommodation member and the first motor.

The third rotary shaft accommodation member may be provided to be coupled to a second side of the second rotary shaft accommodation member in the width direction W of the wheel. The third rotary shaft may be fixedly coupled to the second rotary shaft accommodation member. The connection member may be fixedly coupled to the first motor and the second rotary shaft accommodation member.

The drive module may further include: a second rotary shaft accommodation member provided at a first side of the second motor and configured to accommodate the second rotary shaft; and a third rotary shaft accommodation member provided at a first side of the third motor and configured to accommodate the third rotary shaft, in which a first side of the third rotary shaft accommodation member in the radial direction R faces the first motor, and a second side of the third rotary shaft accommodation member in the radial direction R faces the second rotary shaft accommodation member.

The third rotary shaft may be fixedly coupled to the first motor. The third rotary shaft may be fixedly coupled to the second rotary shaft accommodation member. The second sensor may be provided at a first end portion of two opposite end portions of the second rotary shaft accommodation member in the width direction W which is spaced apart from the wheel, and the third sensor may be provided at a second or outer end portion of two opposite end portions of the third rotary shaft accommodation member in the radial direction R.

The second sensor may be provided at a first end portion of two opposite end portions of the second rotary shaft accommodation member in the width direction W which is adjacent to the wheel, and the third sensor may be provided at a first end portion of two opposite end portions of the third rotary shaft accommodation member in the width direction W which is spaced apart from the wheel. The second sensor may be provided at a first end portion of two opposite end portions of the second rotary shaft accommodation member in a width direction W of the wheel which is spaced apart from the wheel, and the third sensor may be provided at a second or lower end portion of two opposite end portions of the third rotary shaft accommodation member in the radial direction R.

The second sensor may be provided at a first end portion of two opposite end portions of the second rotary shaft accommodation member in a width direction W of the wheel which is adjacent to the wheel, and the third sensor may be provided at a first end portion of two opposite end portions of the third rotary shaft accommodation member in the width direction W which is spaced apart from the wheel.

According to the present disclosure, it is possible to provide the drive module having the novel structure that may have various degrees of freedom in comparison with the related art, thereby coping with a change in external factors such as an environment of a ground surface.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, a drive module according to the present disclosure will be described with reference to the drawings.

Drive Module

Figure 1:
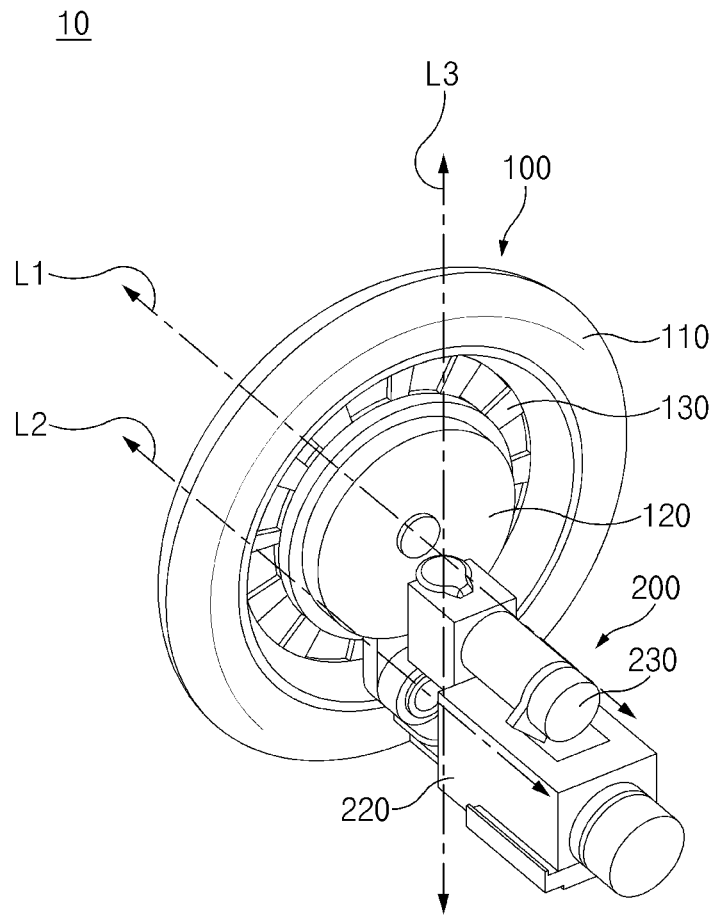
FIG. 1 is a perspective view illustrating a structure of a drive module according to a first embodiment of the present disclosure.
Figure 2:
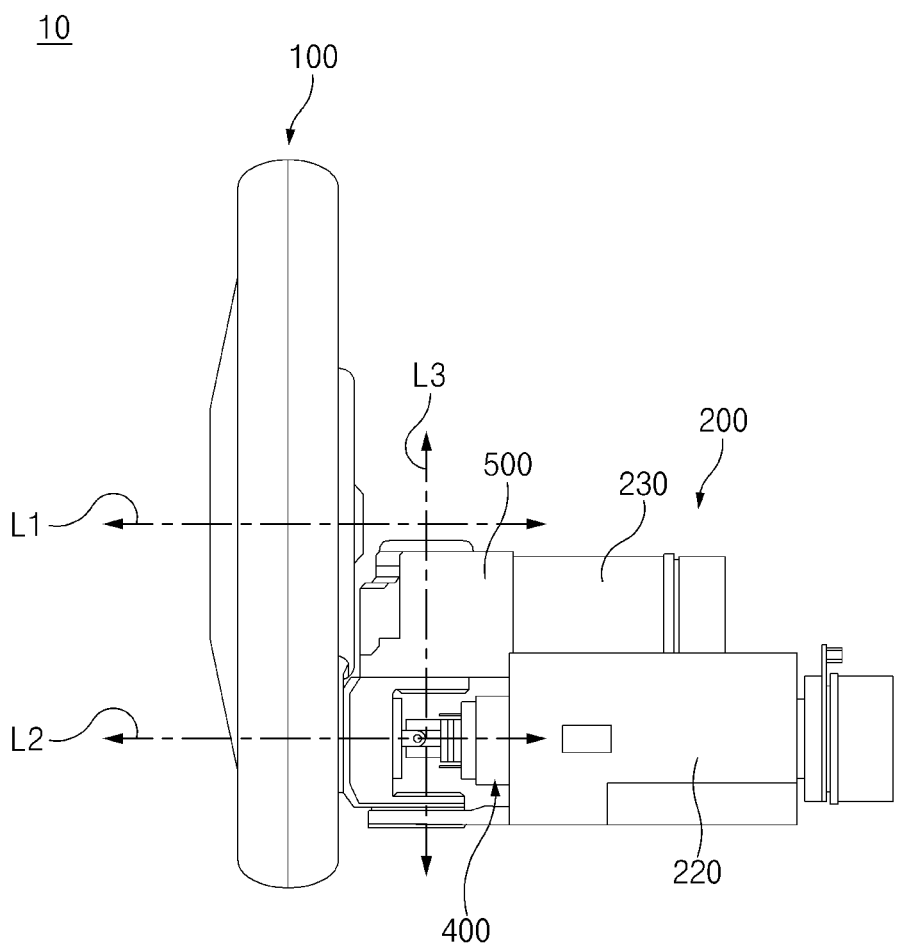
FIG. 2 is a front view illustrating the structure of the drive module according to the first embodiment of the present disclosure.
Figure 3:
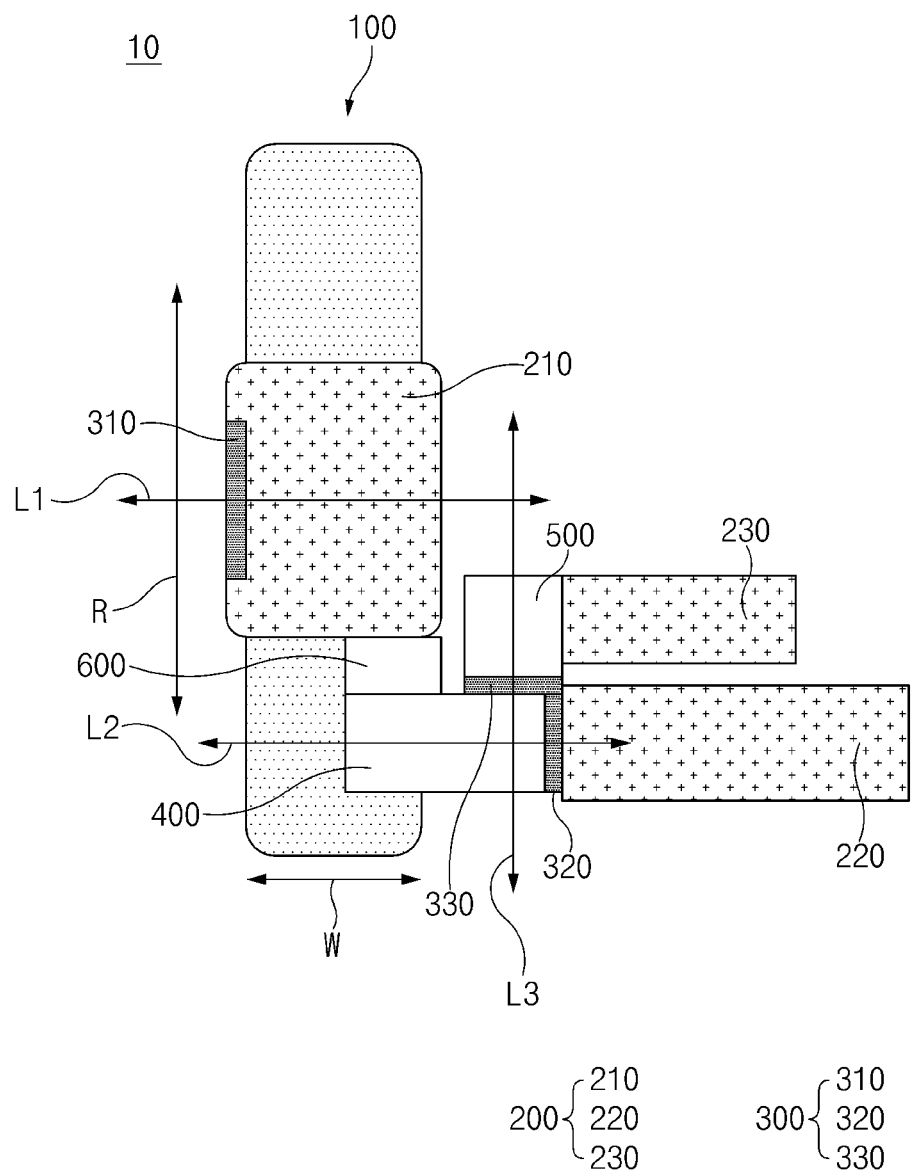
FIG. 3 is a side view schematically illustrating an example of the structure of the drive module according to the first embodiment of the present disclosure.
Figure 4:
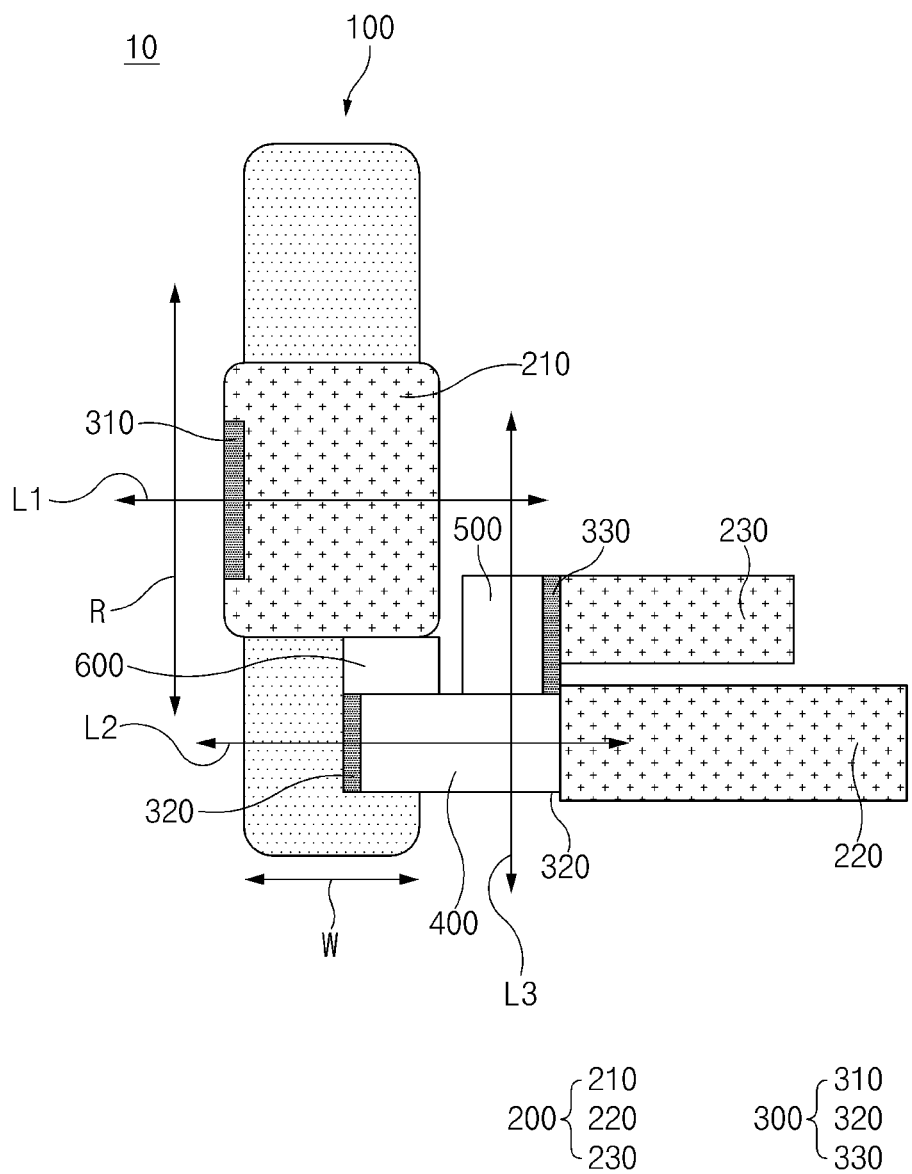
FIG. 4 is a side view schematically illustrating another example of the structure of the drive module according to the first embodiment of the present disclosure.
Figure 5:
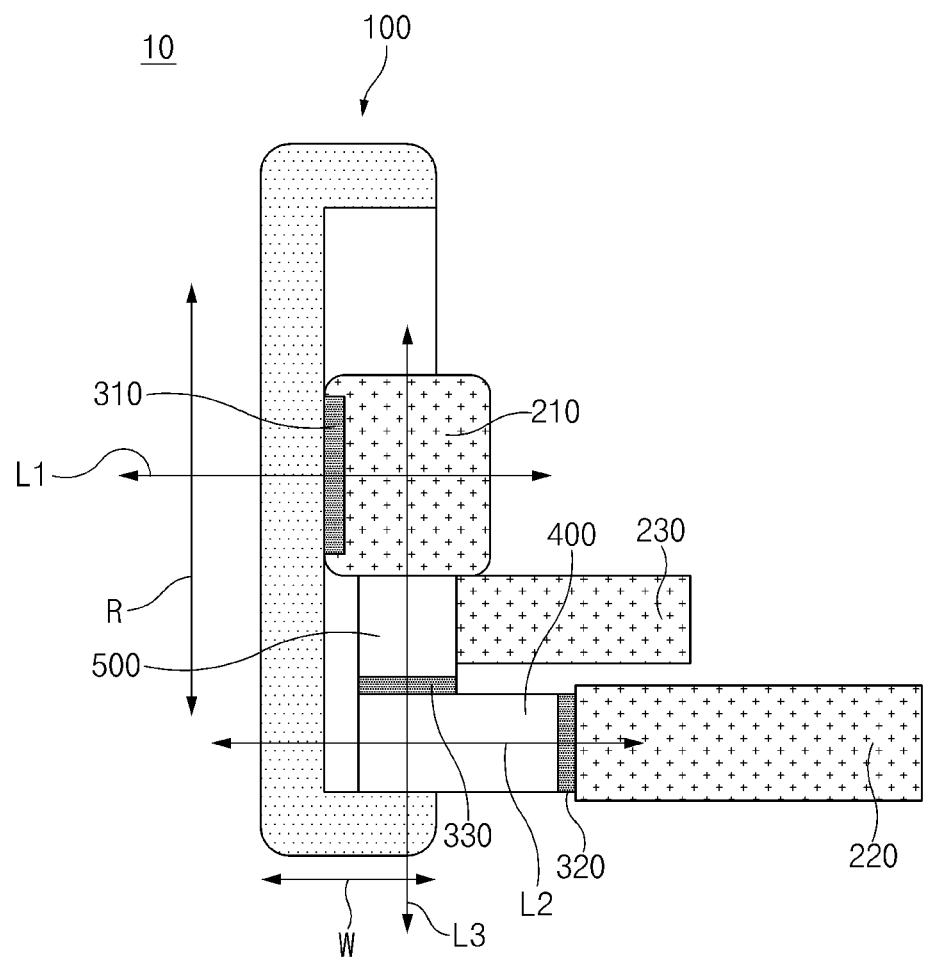
FIG. 5 is a side view schematically illustrating an example of a structure of a drive module according to a second embodiment of the present disclosure.
Figure 6:
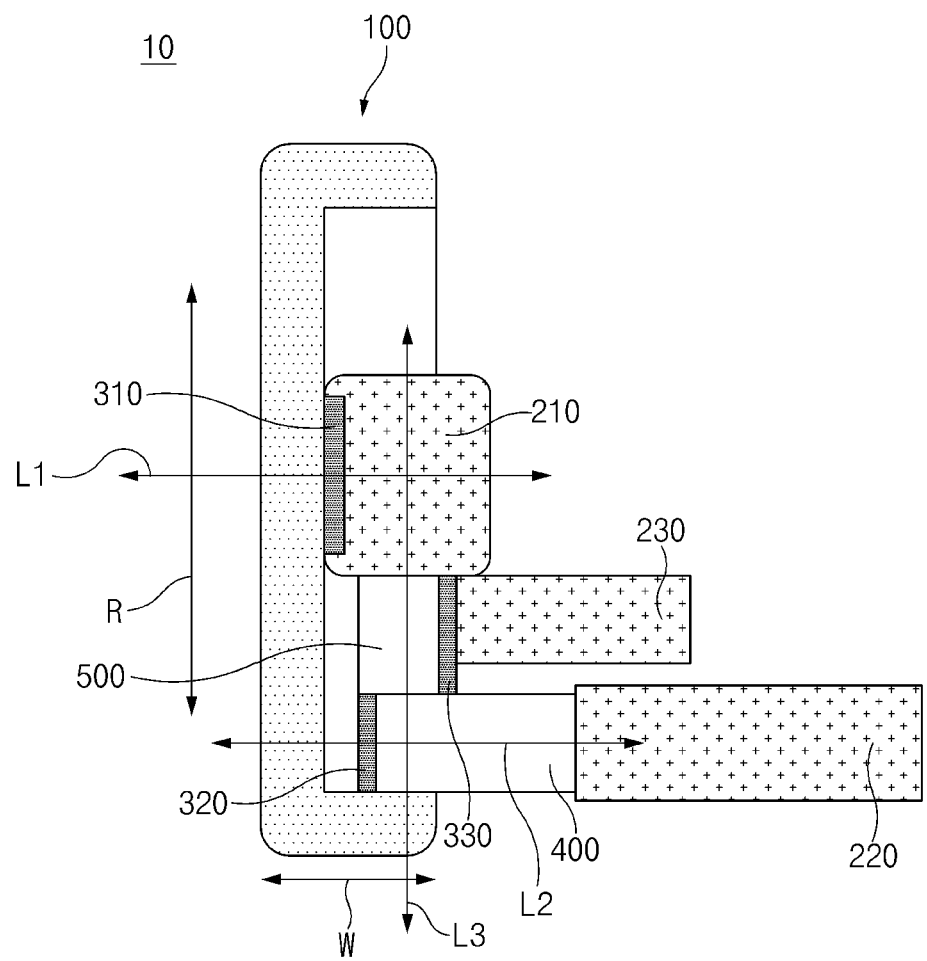
FIG. 6 is a side view schematically illustrating another example of the structure of the drive module according to the second embodiment of the present disclosure.

FIG. 1 is a perspective view illustrating a structure of a drive module according to a first embodiment of the present disclosure, and FIG. 2 is a front view illustrating the structure of the drive module according to the first embodiment of the present disclosure. FIG. 3 is a side view schematically illustrating an example of the structure of the drive module according to the first embodiment of the present disclosure, and FIG. 4 is a side view schematically illustrating another example of the structure of the drive module according to the first embodiment of the present disclosure. In addition, FIG. 5 is a side view schematically illustrating an example of a structure of a drive module according to a second embodiment of the present disclosure, and FIG. 6 is a side view schematically illustrating another example of the structure of the drive module according to the second embodiment of the present disclosure.

Referring to FIGS. 1 to 6, a drive module 10 according to the present disclosure may include a wheel 100, and a drive part 200 having one side coupled to the wheel 100. The drive part 200 may provide power for rotating the wheel 100. In addition, as described below, according to the present disclosure, the drive part 200 may provide power for allowing the drive module 10 to have various postures.

Meanwhile, according to the present disclosure, the drive module 10 may include a plurality of motors that performs different functions. In particular, the drive part 200 may include: a first motor 210 having a first rotary shaft and configured to rotate the wheel 100 about the first rotary shaft; a second motor 220 having a second rotary shaft spaced apart from the first rotary shaft in a radial direction R of the wheel 100 and configured to rotate the wheel 100 about the second rotary shaft; and a third motor 230 having a third rotary shaft extending in a direction intersecting the first rotary shaft and the second rotary shaft and configured to steer the wheel 100 about the third rotary shaft. Because the first to third rotary shafts are provided inside the first to third motors 210, 220, and 230, respectively, FIGS. 1 to 3 do not clearly illustrate the first to third rotary shafts.

However, the drawings illustrate a first extension line L1 which is an imaginary extension line extending from the first rotary shaft, a second extension line L2 which is an imaginary extension line extending from the second rotary shaft, and a third extension line L3 which is an imaginary extension line extending from the third rotary shaft. Hereinafter, in the present specification, the first to third rotary shafts will be described with reference to the first to third extension lines L1, L2, and L3.

Meanwhile, referring to FIGS. 1 and 6, the first rotary shaft may be disposed at a center in the radial direction R of the wheel 100. Therefore, according to the present disclosure, the first motor 210 may rotate the wheel 100 about the first rotary shaft. For example, the first motor 210 may be an in-wheel motor disposed inside the wheel 100. However, alternatively, the first motor may be disposed outside the wheel 100.

For example, referring to FIGS. 1 and 2, the wheel 100 may include: an outer section 110 having an outer peripheral surface in the radial direction R of the wheel 100; an inner section 120 provided inward in the radial direction R from the outer section 110; and a connection section 130 disposed between the inner section 120 and the outer section 110 and configured to connect the outer section 110 and the inner section 120. In particular, the second motor 220 may be provided to face the connection section 130. In addition, when the first motor 210 is an in-wheel motor, the first motor may be provided in an internal space of the inner section 120. Meanwhile, as illustrated in FIGS. 1 and 2, a portion of the connection section 130, which faces the second motor 220, may have a shape recessed outward from the outer section 110 and the inner section 120.

As described above, the second rotary shaft may be spaced apart from the first rotary shaft in the radial direction R of the wheel 100. Therefore, according to the present disclosure, the second motor 220 may rotate the wheel 100 about the second rotary shaft by operating the second rotary shaft. Therefore, the second motor 220 provided in the drive module 10 according to the present disclosure may change the posture of the drive module 10 by changing the position of the wheel 100 relative to the second rotary shaft. More particularly, the first rotary shaft and the second rotary shaft may be disposed parallel to each other. FIGS. 1 and 2 illustrate that the first extension line L1 and the second extension line L2 are parallel to each other. In addition, according to the present disclosure, a distance between the first rotary shaft and the second rotary shaft may be less than a radius of the wheel 100. FIGS. 1 and 2 illustrate that a distance between the first extension line L1 and the second extension line L2 is smaller than the radius of the wheel 100. However, alternatively, a distance between the first rotary shaft and the second rotary shaft may be greater than the radius of the wheel 100.

Meanwhile, as described above, the third rotary shaft may intersect the first rotary shaft and the second rotary shaft. More particularly, the third rotary shaft may be disposed perpendicular to the first rotary shaft and the second rotary shaft. FIGS. 2 and 3 illustrate that the third extension line L3 is perpendicular to the first extension line L1 and the second extension line L2.

In addition, according to the present disclosure, the second extension line L2, which is the extension line of the second rotary shaft, may be orthogonal to the third extension line L3 which is the extension line of the third rotary shaft. When the second rotary shaft has a predetermined rotation angle, the first extension line L1, which is the extension line of the first rotary shaft, may be orthogonal to the third extension line L3 which is the extension line of the third rotary shaft. FIGS. 1 to 6 illustrate that the first extension line L1 and the third extension line L3 are orthogonal to each other in a state in which the second rotary shaft is rotated to position the second motor 220 at a lowermost end with respect to the wheel 100. Similarly, according to the present disclosure, the first extension line L1 and the third extension line L3 may be orthogonal to each other even in a state in which the second rotary shaft is rotated to position the second motor 220 at an uppermost end with respect to the wheel.

Meanwhile, referring to FIGS. 3 to 6, the drive module 10 according to the present disclosure may further include a sensor part 300 configured to detect the motion of the drive part 200. More particularly, the sensor part 300 may be configured to detect the motions of the rotary shafts of the motors provided in the drive part 200. The sensor part 300 may include: a first sensor 310 configured to detect a motion of the first rotary shaft provided in the first motor 210; a second sensor 320 configured to detect a motion of the second rotary shaft provided in the second motor 220; and a third sensor 330 configured to detect a motion of the third rotary shaft provided in the third motor 230.

In addition, as illustrated in FIGS. 3 and 4, the drive module 10 according to the first embodiment of the present disclosure may further include: a second rotary shaft accommodation member 400 provided at a first side of the second motor 220 and configured to accommodate the second rotary shaft; a third rotary shaft accommodation member 500 provided at a first side of the third motor 230 and configured to accommodate the third rotary shaft; and a connection member 600 coupled to a first side of the second rotary shaft accommodation member 400 in a width direction W of the wheel 100 and provided between the second rotary shaft accommodation member 400 and the first motor 210.

In particular, according to the first embodiment of the present disclosure, the third rotary shaft accommodation member 500 may be coupled to a second side of the second rotary shaft accommodation member 400 in the width direction W of the wheel 100. Therefore, according to the first embodiment of the present disclosure, the third rotary shaft accommodation member 500 and the connection member 600 may be spaced apart from each other in the width direction W.

In addition, according to the first embodiment of the present disclosure, the connection member 600 may be fixedly coupled to the first motor 210 and the second rotary shaft accommodation member 400. Therefore, according to the first embodiment of the present disclosure, a relative positional relationship between the connection member 600 and the first motor 210 and a positional relationship between the connection member 600 and the second rotary shaft accommodation member 400 may not be changed regardless of whether the first to third motors 210, 220, and 230 operate.

Meanwhile, according to the first embodiment of the present disclosure, the third rotary shaft provided in the third motor 230 may be fixedly coupled to the second rotary shaft accommodation member 400. Therefore, when the third rotary shaft rotates, the second rotary shaft accommodation member 400 may rotate together with the third rotary shaft, thereby steering the wheel 100. More particularly, according to the first embodiment of the present disclosure, the second rotary shaft accommodation member 400 and the connection member 600 may be fixedly coupled to each other, and the connection member 600 and the first motor 210 may be fixedly coupled to each other. In particular, when the third rotary shaft, the second rotary shaft accommodation member 400, the connection member 600, and the first motor 210 integrally may rotate, thereby steering the wheel 100.

In contrast, as illustrated in FIGS. 5 and 6, the drive module 10 according to the second embodiment of the present disclosure may not include the above-mentioned connection member. In other words, the drive module 10 according to the second embodiment of the present disclosure may include the second rotary shaft accommodation member 400 provided at a first side of the second motor 220 and configured to accommodate the second rotary shaft, and the third rotary shaft accommodation member 500 provided at a first side of the third motor 230 and configured to accommodate the third rotary shaft. Further, according to the second embodiment of the present disclosure, a first side of the third rotary shaft accommodation member 500 in the radial direction R of the wheel 100 may face the first motor 210, and a second side of the third rotary shaft accommodation member 500 in the radial direction R of the wheel 100 may face the second rotary shaft accommodation member 400.

Meanwhile, according to the second embodiment of the present disclosure, the third rotary shaft provided in the third motor 230 may be fixedly coupled to the first motor 210. In particular, since the relative positional relationship between the third rotary shaft and the first motor 210 is not changed even when the third rotary shaft is rotated by the third motor 230, the wheel 100 may be steered as the first motor 210 is rotated about the third rotary shaft (or the third extension line L3) by the rotation of the third rotary shaft. In addition, the third rotary shaft may also be fixedly coupled to the second rotary shaft accommodation member 400. In contrast, the third rotary shaft may be provided to be rotatable with respect to the third rotary shaft accommodation member 500. Therefore, when the third rotary shaft rotates, the first motor 210 and the second rotary shaft accommodation member 400 rotate together with the third rotary shaft, such that the wheel 100 is steered. In contrast, the third rotary shaft accommodation member 500 may be fixed without rotating.

Hereinafter, the sensor part 300 provided in the drive module 10 according to the present disclosure will be described in detail with reference to FIGS. 3 to 6.

For example, as illustrated in FIGS. 3 to 6, the first sensor 310 may be provided in a central region of the first motor 210 in the radial direction R. In addition, as illustrated in FIG. 3, according to one example of the first embodiment of the present disclosure, the second sensor 320 may be disposed at one end portion (a right or first end portion based on FIG. 3) of the two opposite end portions of the second rotary shaft accommodation member 400 in the width direction W which is spaced apart from the wheel 100. In addition, the third sensor 330 may be disposed at an outer end portion (a lower end or second portion based on FIG. 3) of the two opposite end portions of the third rotary shaft accommodation member 500 in the radial direction R.

In contrast, as illustrated in FIG. 4, according to another example of the first embodiment of the present disclosure, the second sensor 320 may be disposed at one end portion (a left or first end portion based on FIG. 4) of the two opposite end portions of the second rotary shaft accommodation member 400 in the width direction W which is adjacent to the wheel 100. In addition, the third sensor 330 may be disposed at one end portion (a right end or first portion based on FIG. 4) of the two opposite end portions of the third rotary shaft accommodation member 500 in the width direction W which is spaced apart from the wheel 100.

Meanwhile, as illustrated in FIG. 5, according to one example of the second embodiment of the present disclosure, the second sensor 320 may be disposed at one end portion (a right or first end portion based on FIG. 5) of the two opposite end portions of the second rotary shaft accommodation member 400 in the width direction W which is spaced apart from the wheel 100. In addition, the third sensor 330 may be disposed at an outer end portion (a lower or second end portion based on FIG. 5) of the two opposite end portions of the third rotary shaft accommodation member 500 in the radial direction R.

In contrast, as illustrated in FIG. 6, according to another example of the second embodiment of the present disclosure, the second sensor 320 may be disposed at one end portion (a left or first end portion based on FIG. 6) of the two opposite end portions of the second rotary shaft accommodation member 400 in the width direction W while adjacent to the wheel 100. In addition, the third sensor 330 may be disposed at one end portion (a right or first end portion based on FIG. 6) of the two opposite end portions of the third rotary shaft accommodation member 500 in the width direction W which is spaced apart from the wheel 100.

Meanwhile, the first to third sensors 310, 320, and 330 provided in the sensor part 300 of the drive module 10 according to the present disclosure may each be an encoder. The encoder may be an incremental encoder or an absolute encoder. The incremental encoder may be an encoder configured to detect a motion by outputting an increment or a decrement from any point in the encoder. In contrast, the absolute encoder may be an encoder configured to detect a motion by outputting measured values as a whole. However, the first to third sensors 310, 320, and 330 are not limited to the encoder, and various types of sensors may be used. For example, the first to third sensors may each be a resolver.

Figure 7:
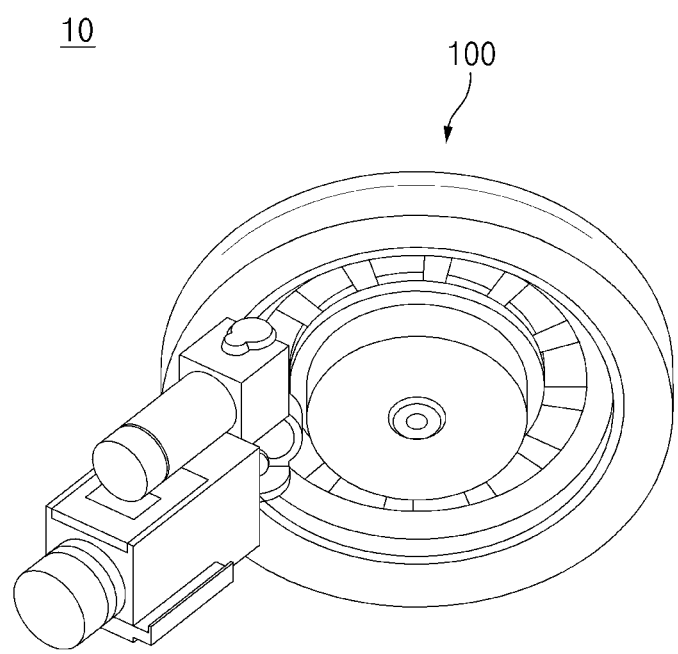
FIG. 7 is a perspective view illustrating a first operational example of the drive module according to the present disclosure.
Figure 8:
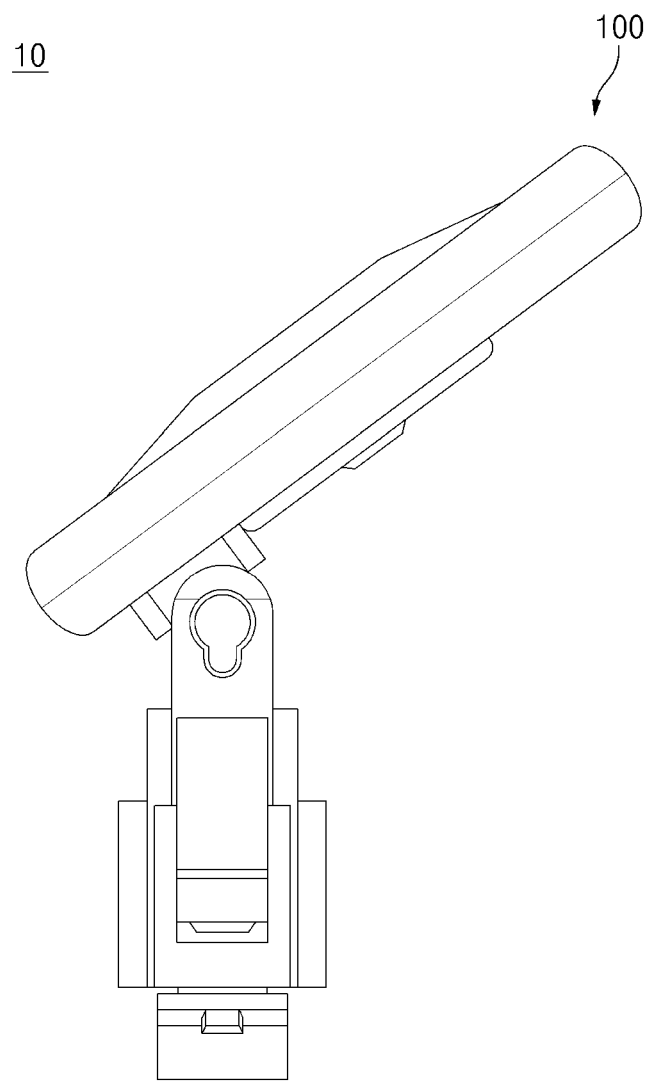
FIG. 8 is a top plan view illustrating the first operational example of the drive module according to the present disclosure.
Figure 9:
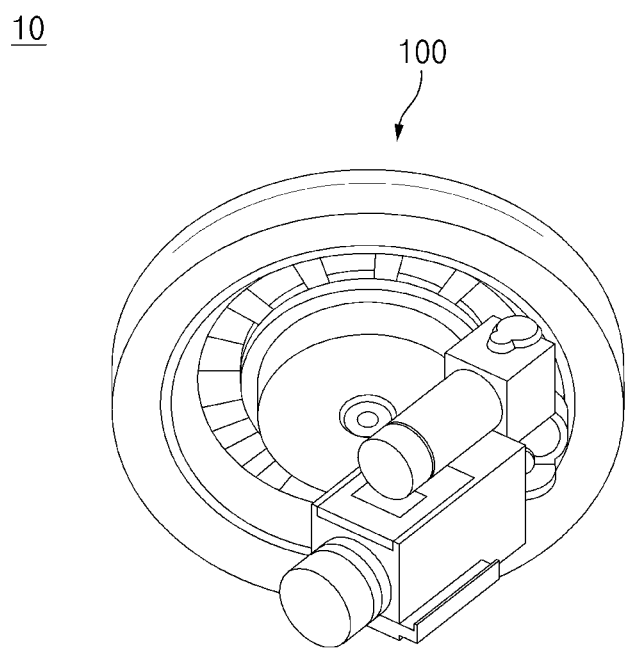
FIG. 9 is a perspective view illustrating a second operational example of the drive module according to the present disclosure.
Figure 10:
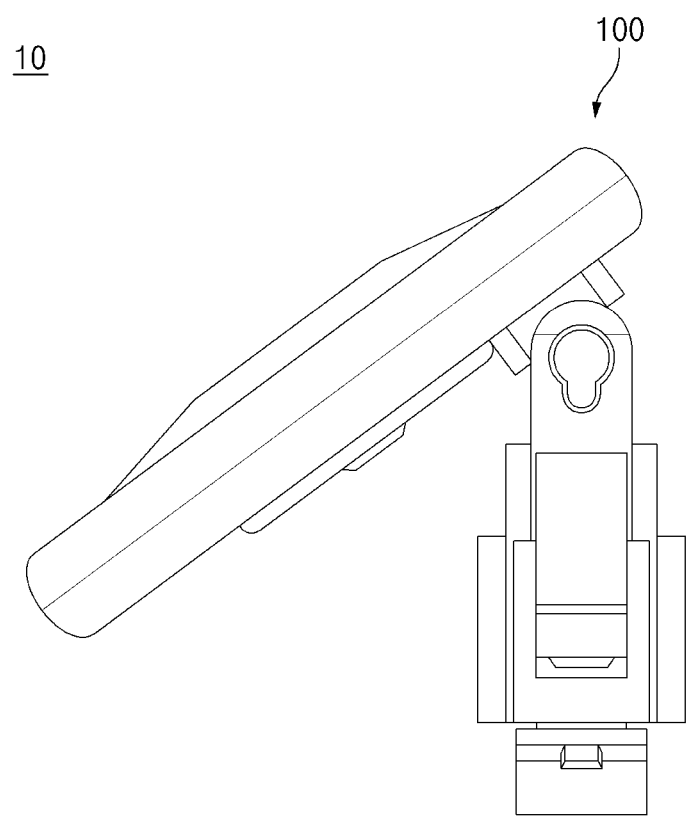
FIG. 10 is a top plan view illustrating the second operational example of the drive module according to the present disclosure.

FIG. 7 is a perspective view illustrating a first operational example of the drive module according to the present disclosure, and FIG. 8 is a top plan view illustrating the first operational example of the drive module according to the present disclosure. FIG. 9 is a perspective view illustrating a second operational example of the drive module according to the present disclosure, and FIG. 10 is a top plan view illustrating the second operational example of the drive module according to the present disclosure. In addition, FIG. 11 is a perspective view illustrating a third operational example of the drive module according to the present disclosure, and FIG. 12 is a top plan view illustrating the third operational example of the drive module according to the present disclosure.

According to the present disclosure, the first motor 210 may be configured to operate to rotate the wheel 100 about the axis of the wheel, and the second motor 220 and the third motor 230 may be configured to operate to allow the drive module 10 to have various postures. For example, referring to FIGS. 1 to 6, the drive module 10 may have a posture illustrated in FIGS. 7 and 8 when the wheel 100 is steered as the second motor 220 operates so that the first rotary shaft (or the first extension line L1) and the second rotary shaft (or the second extension line L2) are parallel to each other in the horizontal direction and then the third motor 230 operates so that the wheel 100 moves away from the third motor 230.

In addition, the drive module 10 may have a posture illustrated in FIGS. 9 and 10 when the wheel 100 is steered as the second motor 220 operates to position the first rotary shaft (or the first extension line L1) and the second rotary shaft (or the second extension line L2) parallel to each other in the horizontal direction and then the third motor 230 operates to cause the wheel 100 to move close to the third motor 230.

Figure 11:
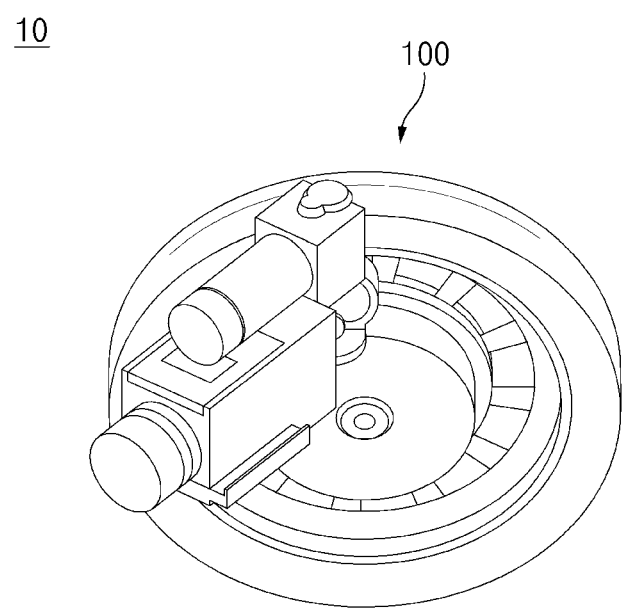
FIG. 11 is a perspective view illustrating a third operational example of the drive module according to the present disclosure.
Figure 12:
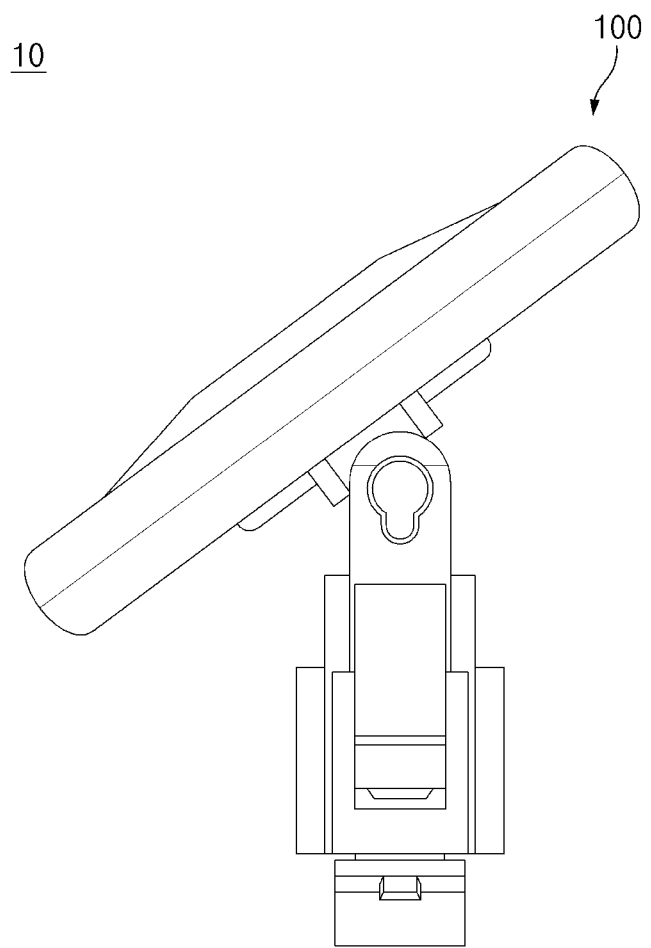
FIG. 12 is a top plan view illustrating the third operational example of the drive module according to the present disclosure.

The drive module 10 may have a posture illustrated in FIGS. 11 and 12 when the wheel 100 is steered as the second motor 220 operates to position the first rotary shaft (or the first extension line L1) and the second rotary shaft (or the second extension line L2) parallel to each other in the vertical direction and then the third motor 230 may operate.

The present disclosure has been described with reference to the limited embodiments and the drawings, but the present disclosure is not limited thereto. The present disclosure may be carried out in various forms by those skilled in the art to which the present disclosure pertains within the technical spirit of the present disclosure and within the scope equivalent to the appended claims.

What is claimed is:

1. A drive module, comprising:
   a wheel;
   a drive part having one side coupled to the wheel; and
   a sensor part configured to detect a motion of the drive part,
   wherein the drive part includes:
      a first motor having a first rotary shaft and configured to rotate the wheel about the first rotary shaft;
      a second motor having a second rotary shaft spaced apart from the first rotary shaft in a radial direction R of the wheel, the second motor being configured to rotate the wheel about the second rotary shaft; and
      a third motor having a third rotary shaft extending in a direction intersecting the first rotary shaft and the second rotary shaft, the third motor being configured to steer the wheel about the third rotary shaft, and
   wherein the sensor part includes:
      a first sensor configured to detect a motion of the first rotary shaft;
      a second sensor configured to detect a motion of the second rotary shaft; and
      a third sensor configured to detect a motion of the third rotary shaft.

2. The drive module of claim 1, wherein the first rotary shaft is disposed at a center in the radial direction R of the wheel, and the first motor rotates the wheel about the first rotary shaft.

3. The drive module of claim 1, wherein the second motor rotates the wheel about the second rotary shaft such that a position of the wheel relative to the second rotary shaft can change.

4. The drive module of claim 3, wherein the first rotary shaft and the second rotary shaft are provided in parallel with each other.

5. The drive module of claim 1, wherein a distance between the first rotary shaft and the second rotary shaft is less than a radius of the wheel.

6. The drive module of claim 1, wherein the third rotary shaft is disposed to be perpendicular to the first rotary shaft and the second rotary shaft.

7. The drive module of claim 1, wherein an extension line of the first rotary shaft and an extension line of the third rotary shaft are disposed orthogonal to each other when the second rotary shaft has a predetermined rotation angle.

8. The drive module of claim 1, wherein an extension line of the second rotary shaft and an extension line of the third rotary shaft are disposed orthogonal to each other.

9. The drive module of claim 1, further comprising:
   a second rotary shaft accommodation member disposed at one side of the second motor and configured to accommodate the second rotary shaft;
   a third rotary shaft accommodation member disposed at one side of the third motor and configured to accommodate the third rotary shaft; and
   a connection member coupled to a first side of the second rotary shaft accommodation member in a width direction W of the wheel and disposed between the second rotary shaft accommodation member and the first motor.

10. The drive module of claim 9, wherein the third rotary shaft accommodation member is disposed to be coupled to a second side of the second rotary shaft accommodation member in the width direction W of the wheel.

11. The drive module of claim 10, wherein the third rotary shaft is fixedly coupled to the second rotary shaft accommodation member.

12. The drive module of claim 9, wherein the connection member is fixedly coupled to the first motor and the second rotary shaft accommodation member.

13. The drive module of claim 9, wherein the second sensor is disposed at one end portion of two opposite end portions of the second rotary shaft accommodation member in the width direction W which is spaced apart from the wheel, and the third sensor is disposed at an outer end portion of two opposite end portions of the third rotary shaft accommodation member in the radial direction R.

14. The drive module of claim 9, wherein the second sensor is disposed at one end portion of two opposite end portions of the second rotary shaft accommodation member in the width direction W which is adjacent to the wheel, and the third sensor is disposed at one end portion of two opposite end portions of the third rotary shaft accommodation member in the width direction W which is spaced apart from the wheel.

15. The drive module of claim 1, further comprising:
   a second rotary shaft accommodation member disposed at one side of the second motor and configured to accommodate the second rotary shaft; and
   a third rotary shaft accommodation member disposed at one side of the third motor and configured to accommodate the third rotary shaft,
   wherein a first side of the third rotary shaft accommodation member in the radial direction R faces the first motor, and a second side of the third rotary shaft accommodation member in the radial direction R faces the second rotary shaft accommodation member.

16. The drive module of claim 15, wherein the third rotary shaft is fixedly coupled to the first motor.

17. The drive module of claim 15, wherein the third rotary shaft is fixedly coupled to the second rotary shaft accommodation member.

18. The drive module of claim 15, wherein the second sensor is disposed at one end portion of two opposite end portions of the second rotary shaft accommodation member in a width direction W of the wheel which is spaced apart from the wheel, and the third sensor is disposed at a lower end portion of two opposite end portions of the third rotary shaft accommodation member in the radial direction R.

19. The drive module of claim 15, wherein the second sensor is disposed at one end portion of two opposite end portions of the second rotary shaft accommodation member in a width direction W of the wheel which is adjacent to the wheel, and the third sensor is disposed at one end portion of two opposite end portions of the third rotary shaft accommodation member in the width direction W which is spaced apart from the wheel.

\* \* \* \* \*